United States Patent [19]

Teidemann, Jr. et al.

[11] Patent Number: 5,509,035
[45] Date of Patent: Apr. 16, 1996

[54] MOBILE STATION OPERATING IN AN ANALOG MODE AND FOR SUBSEQUENT HANDOFF TO ANOTHER SYSTEM

[75] Inventors: Edward G. Teidemann, Jr.; Alejandro R. Holcman, both of San Diego, Calif.

[73] Assignee: Qualcomm Incorporated, San Diego, Calif.

[21] Appl. No.: 383,555

[22] Filed: Jan. 31, 1995

Related U.S. Application Data

[63] Continuation of Ser. No. 47,719, Apr. 14, 1993, abandoned.

[51] Int. Cl.$^6$ ........................................ H04L 7/00
[52] U.S. Cl. .................. 375/356; 375/357; 375/358; 375/367; 370/103; 370/107; 370/108; 455/33.2; 455/57.1; 455/54.1; 379/60
[58] Field of Search ........................ 375/200, 205, 375/208, 354, 355, 356, 357, 358, 362, 367; 370/103, 105, 107, 108; 455/33.2, 49.1, 51.1, 54.1, 54.2, 56.1; 379/58–60

[56] References Cited

U.S. PATENT DOCUMENTS

| | | | |
|---|---|---|---|
| 4,807,259 | 2/1989 | Yamanaka et al. | 375/109 |
| 4,890,303 | 12/1989 | Bader | 375/107 |
| 5,136,614 | 8/1992 | Hiramatsu et al. | 375/119 |
| 5,146,585 | 9/1992 | Smith III | 375/108 |
| 5,220,676 | 6/1993 | LoGalbo et al. | 455/56.1 |
| 5,229,996 | 7/1993 | Bäckström et al. | 455/33.1 |
| 5,257,401 | 10/1993 | Dahlin et al. | 375/5 |
| 5,257,404 | 10/1993 | Goreham et al. | 375/107 |
| 5,280,498 | 1/1994 | Tymes et al. | 375/200 |
| 5,280,501 | 1/1994 | Owen | 375/119 |
| 5,295,152 | 3/1994 | Gudmundson et al. | 455/33.1 |
| 5,313,489 | 5/1994 | Menich et al. | 375/1 |
| 5,355,515 | 10/1994 | Sicher | 455/56.1 |

*Primary Examiner*—Stephen Chin
*Assistant Examiner*—Amanda T. Le
*Attorney, Agent, or Firm*—Russell B. Miller; Katherine W. White

[57] ABSTRACT

A method of mobile station synchronization to a system time, wherein the time alignment is attained while the mobile station operates in analog mode. The mobile stations transmits a periodic signal, each period of which has a leading edge. The base station detects the leading edge of the periodic signal and compares it to an indication of system time. The base station generates an error message for the mobile station indicating an update to the phase of the periodic signal. When the mobile station and the base station are time aligned, the base station may send a message indicating the absolute time at some future leading edge of the periodic signal thereby eliminating ambiguities of time due to the finite time required to receive the message.

27 Claims, 8 Drawing Sheets

| | | | | | | | | | INTEGRATION RESULT |
|---|---|---|---|---|---|---|---|---|---|
| A. | CODE PHASE 1 | 1 | -1 | 1 | -1 | -1 | 1 | 1 | |
| | RECEIVED SEQUENCE | 1 | -1 | 1 | -1 | -1 | 1 | 1 | |
| | PRODUCT | 1 | 1 | 1 | 1 | 1 | 1 | 1 | SUM = 7 |
| B. | CODE PHASE 2 | 1 | 1 | -1 | 1 | -1 | -1 | 1 | |
| | RECEIVED SEQUENCE | 1 | -1 | 1 | -1 | -1 | 1 | 1 | |
| | PRODUCT | 1 | -1 | -1 | -1 | 1 | -1 | 1 | SUM = -1 |
| C. | CODE PHASE 3 | 1 | 1 | 1 | -1 | 1 | -1 | -1 | |
| | RECEIVED SEQUENCE | 1 | -1 | 1 | -1 | -1 | 1 | 1 | |
| | PRODUCT | 1 | -1 | 1 | 1 | -1 | -1 | -1 | SUM = -1 |
| D. | CODE PHASE 4 | -1 | 1 | 1 | 1 | -1 | 1 | -1 | |
| | RECEIVED SEQUENCE | 1 | -1 | 1 | -1 | -1 | 1 | 1 | |
| | PRODUCT | -1 | -1 | 1 | -1 | 1 | 1 | -1 | SUM = -1 |
| E. | CODE PHASE 5 | -1 | -1 | 1 | 1 | 1 | -1 | 1 | |
| | RECEIVED SEQUENCE | 1 | -1 | 1 | -1 | -1 | 1 | 1 | |
| | PRODUCT | -1 | 1 | 1 | -1 | -1 | -1 | 1 | SUM = -1 |
| F. | CODE PHASE 6 | 1 | -1 | -1 | 1 | 1 | 1 | -1 | |
| | RECEIVED SEQUENCE | 1 | -1 | 1 | -1 | -1 | 1 | 1 | |
| | PRODUCT | 1 | 1 | -1 | -1 | -1 | 1 | -1 | SUM = -1 |
| G. | CODE PHASE 7 | -1 | 1 | -1 | -1 | 1 | 1 | 1 | |
| | RECEIVED SEQUENCE | 1 | -1 | 1 | -1 | -1 | 1 | 1 | |
| | PRODUCT | -1 | -1 | -1 | 1 | -1 | 1 | 1 | SUM = -1 |

MOBILE STATION OPERATING IN AN ANALOG MODE AND FOR SUBSEQUENT HANDOFF TO ANOTHER SYSTEM

This is a continuation of application Ser. No. 08/047,719, filed Apr. 14, 1993 now abandoned.

BACKGROUND OF THE INVENTION

I. Field of the Invention

The present invention relates to communications. More particularly, the present invention relates to a novel and improved method for attaining accurate timing at a mobile station that can be used in executing multimode handoffs in a cellular system.

II. Description of the Related Art

Dual mode cellular communication systems are capable of operating in both a standard analog mode and a digital mode. Within such a system, a need may arise to handoff from analog mode to digital mode during an active call. A prolonged discontinuity in service during the handoff from analog mode to digital mode is unacceptable to the users of the system. A quality system must therefore incorporate a dual mode handoff method that causes a minimum interruption of service. However in standard analog mode, time alignment of a mobile station to a predetermined system time is not required and no analogous function is currently available. In digital mode, time alignment is critical and required for communication between the mobile station and the base station. This dissimilarity between the two modes presents a difficulty in compatibility and can cause delays in handoff from analog mode to digital mode.

Within the current analog cellular phone system, a handoff of a mobile station call can be performed between base stations during an active call. One handoff criteria which initiates a handoff is the strength of the mobile station signal arriving at the base station. Initiation of a handoff by the base station begins when the base station with which a mobile station is communicating detects a receive signal strength from the mobile station below a handoff threshold. The base station sends a request to a system controller or mobile switching center (MSC) for a handoff of the call. The system controller polls the neighboring base stations to ascertain an estimate of the signal strength of the mobile station at neighboring base stations, and, from this information, determine a candidate base station. The original base station informs the mobile station of a new frequency assignment and parameters of the candidate base station and directs the mobile station to handoff. The call is then transferred from the original base station to the candidate base station which becomes the new active base station. It should be noted that the procedure above might vary depending on the manufacturer of the equipment performing the functions.

The handoff of a mobile station call in a digital system, such as a Code Division Multiple Access (CDMA) system or Time Division Multiple Access (TDMA), is initiated either by a base station or by a mobile station. In a typical CDMA digital system, neighboring base stations use the same frequency for transmission and therefore, a mobile station can monitor signal strengths of neighboring base stations during an active call. A mobile station sends a message when one of the neighboring base stations' signal arrives at the mobile station at a level exceeding some predetermined threshold thereby initiating a handoff procedure. The system controller commands the neighboring base station to establish communication with the mobile station if resources are available at the neighboring base station. The system controller relays a message to the mobile station, through the active base station, directing the mobile station to establish communication with the neighboring base station. The mobile station establishes communication with the neighboring base station without breaking the call with the active base station. The mobile station can maintain the call with two base stations until one of the base stations signal strength falls below a predetermined level. Further information on handoffs within a digital CDMA system is disclosed in a U.S. Pat. No. 5,101,501 entitled "SOFT HANDOFF IN A CDMA CELLULAR TELEPHONE SYSTEM" issued Mar. 31, 1992, and assigned to the Assignee of the present invention. Also, further information on handoffs within a digital CDMA system is disclosed in a co-pending U.S. patent application Ser. No. 07/847,148, entitled "MOBILE STATION ASSISTED SOFT HANDOFF IN A CDMA CELLULAR COMMUNICATION SYSTEM," filed Mar. 5, 1992, now U.S. Pat. No. 5,267,261, issued Nov. 30, 1993, and assigned to the Assignee of the present invention.

A handoff from digital mode to analog mode is typically easier than the handoff from analog mode to digital mode. A digital mode to analog mode handoff could be initiated by either a mobile station or a base station on the basis of the mobile station having exited the coverage area of the digital system. The digital mode base station can transmit the necessary information about the analog system such as frequency assignment, and supervisory audio tones (SAT) and voice mobile attenuation code (VMAC) information as dictated by the system controller. Then similar to handoff within an analog system, the call can be transferred from the digital mode base station to an analog mode base station.

As a digital system is initially deployed covering only certain localities within an operating system, a need may arise to perform a handoff from analog mode to digital mode. For example, a digital system may be deployed in a metropolitan city but not deployed in the surrounding suburban areas. A user may initiate an analog call as he leaves the suburban area driving towards the city. As he approaches the metropolitan area, the heavily laden analog system may not have the capacity to accept the transfer of his call and may necessitate that the call be "dropped" thereby terminating the call before completion. If the dual mode system were capable of transferring the call from the analog system to the higher capacity digital system, the dropped call could be avoided.

Another example of a need for a handoff from analog mode to digital mode is in conjunction with the use of private branch exchange (PBX). A digital PBX system integrated into an office building might be surrounded by an analog system outside of the building. A handoff from the outside analog system to the inside digital system would take place as the user entered the building while maintaining an active call. If the system could not perform such a handoff, the call could be dropped due to the inability of the analog signals to penetrate the walls of the building and maintain signal levels capable of supporting continued communication.

A complication to the handoff from analog mode to digital mode is that digital mode requires a finite time duration for the mobile station to synchronize (acquire time alignment). The acquisition time is highly variable depending heavily on many factors including the system architecture of the digital system deployed, the signal to noise level at the mobile station at the time of attempted acquisition, the accuracy of the initial guess, and the acquisition algorithm used. In a typical CDMA system, the average system acquisition time is several seconds. The acquisition time in TDMA systems is generally less than in CDMA systems. Regardless of the case, the discontinuity of service to the end user may be unacceptable in a voice system. The present invention seeks to minimize the acquisition time by performing a preliminary time alignment of the mobile station prior to entering digital mode.

It is therefore an object of the present invention to provide in a cellular communication system a method of mobile station time alignment in analog mode for operation in digital mode.

It is another object of the present invention to provide the alignment function with minimal changes to the mobile station.

It is yet another object of the present invention to provide a alignment method which reduces acquisition time of a mobile station upon entering digital mode.

SUMMARY OF THE INVENTION

The present invention is a novel and improved method for mobile station time alignment including an absolute time of day transfer in analog mode. The performed alignment can be used to reduce the discontinuity in service caused by a handoff from analog mode to digital mode in a cellular communication system. The method aligns the mobile station timing in analog mode prior to performing a handoff to digital mode.

In order to reduce the acquisition time for a mobile station, an estimate of master system time is transferred to the mobile station before entering digital mode. Since concurrent analog mode and digital mode operation would unreasonably and adversely impact both RF architecture and mobile station control structures, the alignment is performed within the analog mode operation circuitry of the mobile station. The alignment operates within the protocol of the present analog system, commonly called the Advanced Mobile Phone Service (AMPS), as prescribed in Electronic Industry Association standard EIA/TIA-553 "Mobile Station- Land Station compatibility Specification". It requires only minimal software changes in the mobile station where cost is critical while transferring the majority of the new functions, hardware equipment, and software to the base station.

The present invention is a method wherein the base station initiates a time alignment in the mobile station. The base station sends the mobile station a command to continually transmit a periodic signaling tone. The period of the mobile station transmission is related to the period of the pseudorandom code sequence of the digital system. The base station compares the edges of the signaling tone from the mobile station to the pseudorandom code sequence edges of the master system clock and determines an error signal. The base station notifies the mobile station to delay or advance in time the transmitted signaling tones based on the error signal. This procedure may continue until the calculated error falls below a predetermined level. Having attained time alignment, the base station is able to transfer to the mobile station absolute time of day information with increased accuracy. The mobile station is then commanded into digital mode where transition time is reduced to a level tolerable by the end user due to the performed alignment.

Although the methods specifically described pertain to the handoff of a call from an analog system to a digital system, the principle describe herein can be implemented within a variety of operating systems. The benefits of time alignment and the transfer of absolute time specific information has application within an array of systems.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

In a dual mode cellular system wherein analog and digital system deployment is contiguous or coexistent, a method of transferring a call from the analog system to the digital system is needed to provide continuous quality service to the end user. It is therefore required that the discontinuity of service attributed to the acquisition time upon entering digital mode be minimized. The most obvious method of performing this function would be to design mobile stations capable of simultaneous analog and digital operation. However implementing a mobile station with this capability proves difficult and costly. It requires duplication of resources within the mobile station which otherwise could be shared between the two modes. It creates non-optimal RF architectures and complicated software algorithms.

A more practical solution is to perform a preliminary time alignment in analog mode before performing a handoff between analog mode and digital mode. To keep equipment cost down, this alignment is best performed using the present capabilities of the analog system within the mobile station.

Time alignment in a digital system is required for the transfer of data between a mobile station and a base station. For example, in a CDMA system, data is encoded by using a pseudorandom sequence. Only if the mobile station receiver is time aligned with the arriving PN sequence is the data recovered at the mobile station.

Figures 1, 2:
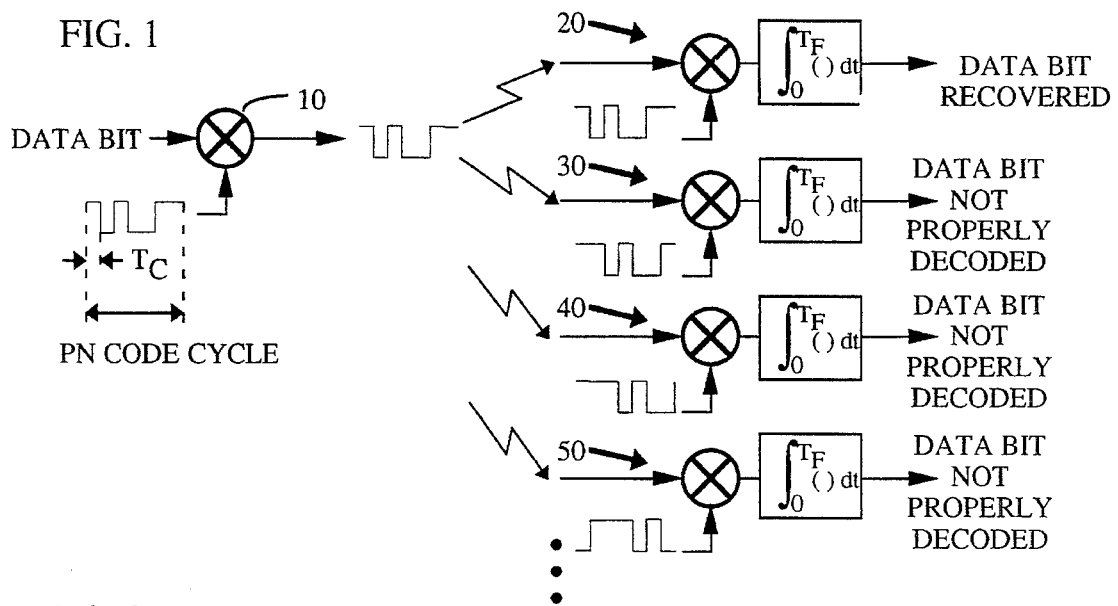
FIG. 1 is an exemplary diagram illustrating the need to time align.
FIG. 2 gives mathematical results to the diagram of FIG. 1.

FIG. 1 is a diagram of a simple exemplary system illustrating the need for time alignment in the mobile station in a spread spectrum CDMA system. The system of FIG. 1 uses a length 7 pseudorandom (PN) code sequence. The duration of each of the 7 chips is called a chip time, $T_c$. In this example base station 10 multiplies a data bit and a complete PN code cycle producing a spread signal for transmission; therefore, this multiplication function is referred to as spreading. In FIG. 1 base station 10 transmits the spread data bit signal to four ideal mobile stations 20, 30, 40 and 50. Each mobile station 20, 30, 40, and 50 multiples the incoming signal with the same PN code sequence used by base station 10 and then integrates the product over one complete PN code cycle, however each of mobile station 20, 30, 40 and 50 has a different PN code offset.

FIG. 2 illustrates mathematically the result of the multiplication and integration within the mobile stations of FIG. 1. For example, mobile station 20 is time aligned with base station 10 and the result of the operations within mobile station 10 are illustrated in FIG. 2A. The time aligned sequence, code phase 1, is multiplied chip by chip with spread data bit signal, received sequence, to produce the product shown. The result of the integration is the sum of the entries in the product line which in FIG. 2A is "SUM=7.". In this case the data bit was a "1" and mobile station 20 successfully recovers the original data bit signal. If the data bit had been a "−1," each entry in the receive data row would be complemented and the sum of the product line would have been "−7."

FIG. 2B represents the operations within mobile station 30. Code phase 2 is exactly one chip time delayed from code phase 1 and the result of the multiplication with the received sequence is a series of 1's and −1's. The sum of the product line of FIG. 2B is −1 and the data bit signal is not properly decoded by mobile station 30.

Likewise FIG. 2C represents the operation within mobile station 40 and FIG. 2D represents mobile station 50. Mobile station 40 has a code phase 3 which is delayed by two chips from the proper code phase 1; and mobile station 50 has code phase 4 which is delayed by three chips from code phase 1. Therefore neither mobile station 40 or mobile station 50 properly decodes the data bit signal. FIG. 2 E–G represent the three remaining possible code phase offsets to explain by example that these offsets also do not properly decode the original data bit signal.

Note that, in FIG. 1, a second base station could be added having an alternate PN code phase offset to the phase of base station 10. In this case, a mobile station also having the alternate PN code phase offset would properly decode the data bit signal of the second base station. In a typical CDMA system, each base station is designated by a unique PN code phase offset different from the surrounding base stations. This allows a base station to communicate with a mobile station with minimal interference to other mobile stations communicating with other base stations.

Note that an additional transmission to a second mobile station from the first base station, similarly, could use a different code phase. In practice, instead of using different code phases, distinction can be achieved by concatenating codes. For example code phase could be used to distinguish different base stations within a system and a second code could be used to distinguish between mobile stations using same base station. Further information on topic is disclosed in a U.S. Pat. No. 5,103,459 entitled "SYSTEM AND METHOD FOR GENERATING SIGNAL WAVEFORMS IN A CDMA CELLULAR TELEPHONE SYSTEM," issued Apr. 7, 1992, assigned to the Assignee of the present invention and the disclosure of which is incorporated by reference herein.

The system of FIGS. 1 and 2 is greatly simplified but it demonstrates the necessity of time alignment in a digital system in order to transfer data. In a typical CDMA system, the length of the PN sequence used to spread the data bit is on the order of 2 is instead of 7. Also in a real system, noise would be present in the signal received at the mobile stations and signal level would vary resulting in the output of the integration varying to some degree. The mobile stations of FIG. 1 have chip timing in that the mobile station knows when the received chips transition. In a real system the chip timing as well as the PN code offset is initially unknown. In a real system, each data bit may be multiplied by only a portion of the complete PN code cycle instead of the entire sequence as shown in FIGS. 1 and 2. The modulation technique of FIGS. 1 and 2 is biphase. Systems that use multiphase signaling techniques, such as quadrature phase signaling techniques, follow the general principles illustrated in FIGS. 1 and 2.

Figure 3:
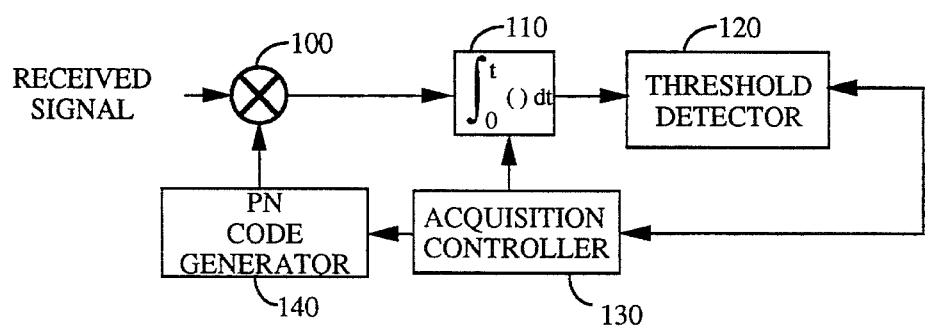
FIG. 3 is a block diagram of an exemplary acquisition structure.

The process of attaining time alignment is called acquisition. FIG. 3 is a basic block diagram of how an acquisition may be performed within a mobile station. PN code generator 140 produces the PN sequence at a phase offset determined by acquisition controller 130. The despreading operation is performed by multiplier 100 and integrator 110 as described above over a first number of PN code chips. Threshold detector 120 compares the integration result to a threshold. When acquisition begins, the mobile station attempts to despread the received signal with an initial PN code phase guess. The initial output of the integration process is passed to threshold detector 120. If the result is less than the threshold, acquisition controller 130 commands PN code generator 140 to shift the PN code applied to the received signal and the process is repeated. If the integration result exceeds the threshold, the despreading operation may be performed for a greater number of PN code chips at the same PN code phase to assure that the acquisition is true and not a false reading caused by excessive noise. The second integration result is compared to a higher threshold. If the second integration result is less than the higher threshold, the PN code is shifted and the process continues using the first threshold. If the second integration result exceeds the second threshold, then the acquisition is confirmed and the mobile station begins to receive the signal from the base station.

Inherently the process of acquisition described above requires a finite time duration to select the proper PN code phase. The acquisition time is highly variable and dependent on many factors. For example if the signal to noise level is low then the integration time needs to be longer resulting in an increased acquisition time. Also the accuracy of the first guess affects the acquisition time. If the first guess is right then the acquisition time is minimal.

As was the case with FIGS. 1 and 2, FIG. 3 and the corresponding algorithm are greatly simplified. Since the phase of the incoming signal are not known, processing may be done on complex I and Q channels. In many systems, the signal itself that the acquisition circuitry is attempting to acquire is a multiphase signal requiring appropriate circuit modifications. Also, the threshold detector may compute a decision statistic. The acquisition controller uses a set of the decision statistics to choose an hypothesis of the most likely PN code phase and chip timing. The acquisition process can be accelerated by having multiple acquisition circuits working in parallel. However, parallel acquisition circuits inherently requires a corresponding increase in circuitry. The acquisition process is complex and can be done through a myriad of techniques that are well known to the communications engineer.

The present invention is a method for attaining an initial PN code phase which is within known limits of the proper PN code phase in order to reduce acquisition time when the handoff from analog mode to digital mode is made. With the knowledge that the initial PN code phase is within predetermined limits, the acquisition algorithm may be optimized for the special case acquisition which occurs following a handoff from analog mode to digital mode to provide minimal acquisition time. In the simple example of FIG. 3, if the code phase is known to be within two chips, both chips may be initially searched using a long integration time and high threshold to minimize the average acquisition time.

Within the current analog system, commonly called the Advanced Mobile Phone Service (AMPS), as prescribed in Electronic Industry Association standard EIA/TIA-553 "Mobile Station—Land Station compatibility Specification", there is a mechanism to communicate digital information bits to the mobile station while an active call is in progress. The connection from the base station to the mobile station during an active call is called the forward voice channel (FVC). The analog voice signals on the FVC may be interrupted by the forward voice channel data stream. A FVC data stream is used to communicate handoff messages and other messages to the mobile station. The FVC data stream format is comprised of a word of information for the mobile station and overhead bits. In the FVC data stream, each word is repeated eleven times. Each transmission of the word is proceeded by overhead bits including a dotting pattern and a word sync pattern. The dotting pattern is used for acquisition of bit synchronization and the word sync pattern is used for word synchronization. Note that synchronization is attained on a message by message basis and that the synchronization required is not analogous to the time alignment required for digital mode operation.

Figure 4:
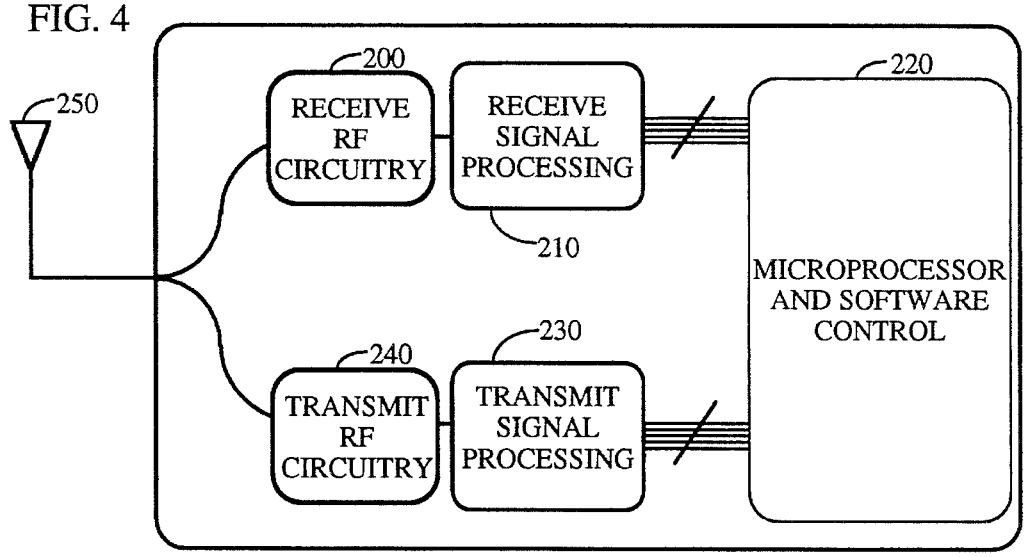
FIG. 4 is a partial block diagram of an analog mobile station.

FIG. 4 is a partial block diagram of an analog mobile station. The incoming signal is received from the base station by antenna 250. The signal is conditioned and converted to baseband by receive radio frequency (RF) circuitry 200. The analog output of receive RF circuitry 200 is processed by receive signal processing circuitry 210. When a FVC data stream is sent to the mobile station during an active call, receive signal processing circuitry 210 converts the FVC data stream to digital bits for processing by microprocessor and software control 220. Microprocessor and software control 220 recognizes the command sent by the base station and acts upon it accordingly.

The connection from the mobile station to the base station during an active call is called the reverse voice channel (RVC). Signaling messages can be sent from the mobile station to the base station over this channel. In addition, the mobile station can send signaling tones (ST) over the RVC to acknowledge commands or to activate certain special functions. For example an ST is used by the mobile station to accept a "call waiting" call. An ST is a 10 kHz tone with a peak deviation of 8 kHz.

Referring again to the block diagram FIG. 4, microprocessor and software control 220 determines a need to transmit an ST and sends a command to transmit an ST of a specified duration to transmit signal processing 230. Transmit signal processing 230 produces the proper analog control signal to provide to transmit RF circuitry 240. Transmit RF circuitry 240, in turn, transmits the ST to the base station for the duration of the control signal via antenna 250.

The present invention uses both the FVC data stream and the ST to attain preliminary time alignment of the mobile station in analog mode. When an analog mode to digital mode handoff is required, the base station, using the present FVC data stream format, sends a word to the mobile station to begin time alignment. At the mobile station, referring again to FIG. 4, receive signal processing 210 converts the FVC data stream containing the alignment word to digital bits for processing by microprocessor and software control 220 in the same manner as it does for any other FVC data stream. Microprocessor and software control 220 must be reprogrammed to recognize the alignment word since the word is a supplementary word created for this invention. The receipt of the alignment word initiates a series of actions by the mobile station detailed in FIG. 5.

Figure 5:
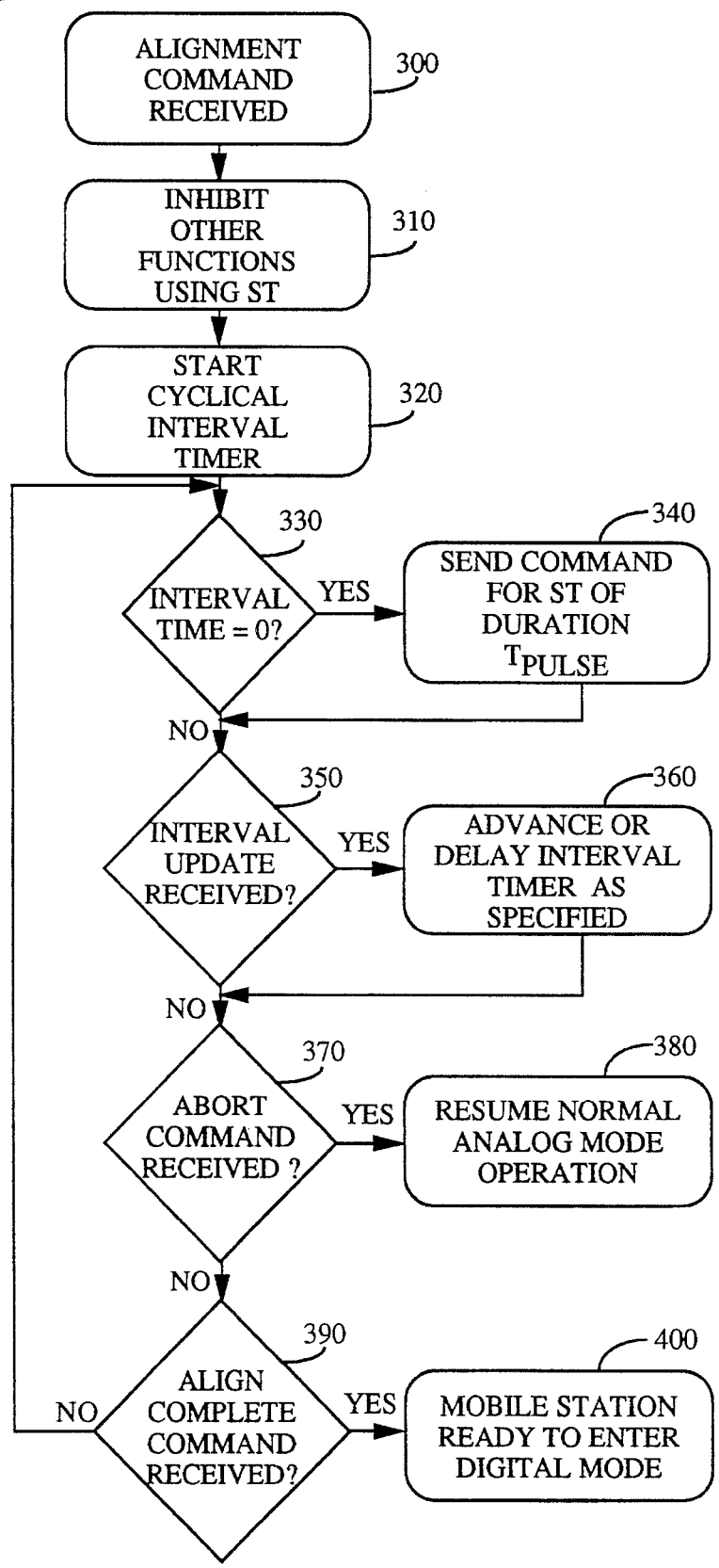
FIG. 5 is a diagram illustrating the various events in the mobile station during analog mode time alignment.

The events of FIG. 5 begin when the alignment word is received at the mobile station as indicated by block 300. The mobile station inhibits other functions using ST, block 310, so that extraneous ST transmissions are not sent by the mobile station during this process. The mobile station starts a cyclical counter called an interval timer which counts from 0 to $T_{INTERVAL}$ as indicated by block 320. The length of $T_{INTERVAL}$ is related to one PN code cycle time of the base stations in the system. The interval timer provides the basis for the initial PN code phase offset when the mobile station enters digital mode. Starting at the same time during each cycle of $T_{INTERVAL}$, the mobile station transmits an ST for a fixed time interval, $T_{PULSE}$. In this example the ST is started whenever the interval timer clock cycles through 0. The mobile station therefore monitors the interval timer as indicated by block 330 and periodically sends a command to the transmit signal processing circuitry to transmit an ST, block 340. The duration of the ST signal, $T_{PULSE}$, must be long enough to reliably ensure that the base station receives sufficient total energy from a sequence of ST pulses to attain a good estimate of the ST timing taking into account the received signal to noise ratio. The mobile station also monitors the FVC for subsequent FVC data stream words. One such word is the interval timer update word that indicates that the interval timer should be delayed or advanced, block 350. If such a word is received the mobile station delays or advances the interval timer thereby causing a one time increase or decrease of time between ST transmission respectively, block 360.

If the base station chooses to abort the handoff from analog mode to digital mode, it notifies the mobile station which is monitoring for such a command, block 370. In this case, the mobile station simply returns to normal analog mode operation, block 380 and aborts the time alignment procedure. Should the abort command not be communicated to the mobile station, the alignment procedure continues. The mobile station determines if an align complete command has been communicated to the mobile station, block 390. If no align complete command is received, the mobile station repeats the alignment process beginning at block 330. When the base station determines that the time alignment is complete, it notifies the mobile station by a subsequent FVC data stream word, block 390. The mobile station is ready to enter digital mode using the PN code phase stored as the interval timer, block 400. In this example, upon entering digital mode the mobile station uses the knowledge that the PN code offset is zero approximately when the interval timer is equal to zero.

Figure 6:
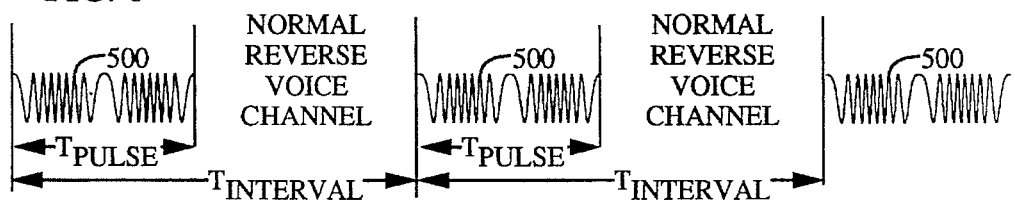
FIG. 6 illustrates the transmissions from the mobile station during time alignment in analog mode.

FIG. 6 illustrates the ST waveform transmitted by the mobile station during the time alignment process. Three ST transmission bursts 500 are shown. An exemplary $T_{PULSE}$ and $T_{INTERVAL}$ are also shown. It is the leading edge in time of each ST which is aligned to the PN code phase of the base station with which the mobile station is going to establish communication upon entering digital mode. Between ST pulses, the mobile station continues normal RVC activities.

The functions presented in FIG. 5 and described above do not require the mobile station to perform functions that are not within the ability of a standard analog mobile station. Additional software is needed to recognize the new FVC data stream words and to perform the functions of FIG. 5 but no duplication or additional hardware is required. Such software is readily devised by one skilled in the art. The burden of additional functions and the sequent additional circuitry is applied to the base station.

Figure 7:
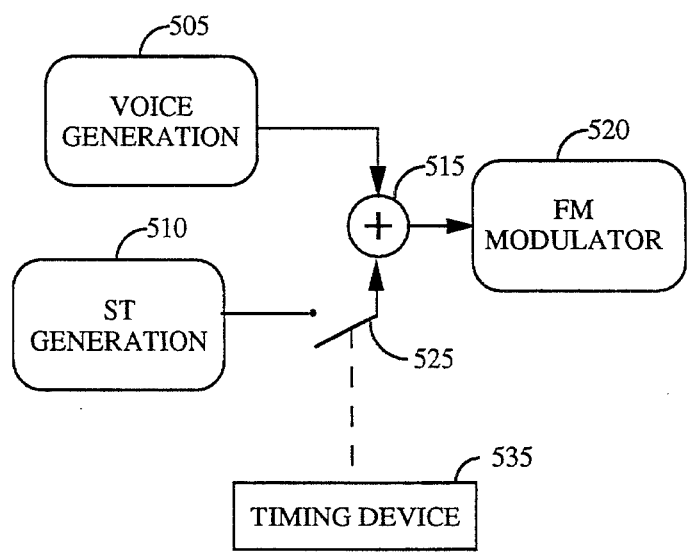
FIG. 7 is a block diagram illustrating a mobile station signaling tone (ST) control configuration.

The timing method, which in FIG. 5 comprises the $T_{INTERVAL}$ timer which is advanced or delayed in response to a command from the base station, can be implemented in a variety of alternative embodiments. FIG. 7 is a block diagram illustrating a signaling tone (ST) control configuration. Voice generation 505 drives FM modulator 520 in normal RVC operation. Switch 525 is closed for duration $T_{PULSE}$ to connect to adder 515 to ST generation 510. Within some phones, the voice generation may be paused for the duration of $T_{PULSE}$. The driving signal to close switch for the duration $T_{PULSE}$ comes from timing device 535 which as stated above can be implemented in a variety of alternative embodiments.

Figure 8:
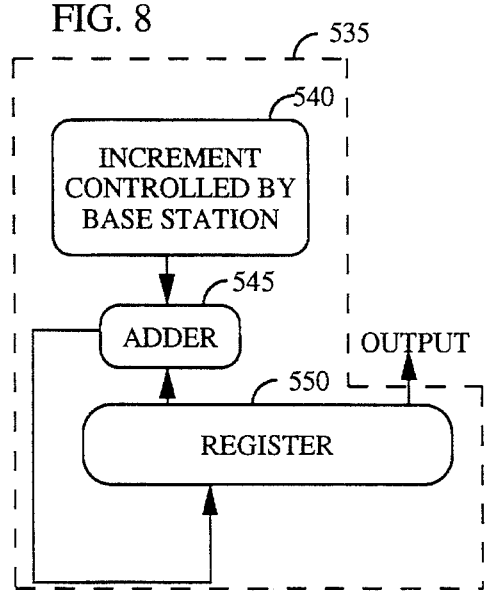
FIG. 8 is a block diagram illustrating a timing device embodiment using a register.

FIG. 8 is a block diagram illustrating an embodiment of timing device 535 using a register. The output of register 550 drives switch 525 of FIG. 7. The register value is added by adder 545 to the output of increment controlled by base station 540. The output of register 550 is a function of the register value being greater than a predetermined threshold. If the output of increment control 540 decreases, the time between ST pulses is increased. If the output of increment control 540 increases, the time between ST pulse is decreased.

Figure 9:
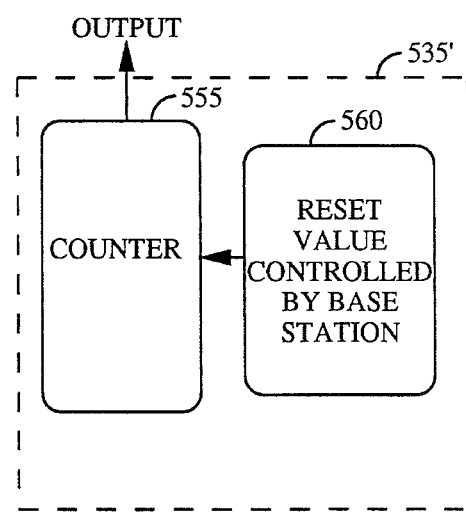
FIG. 9 is a block diagram illustrating a timing device embodiment using a counter.

FIG. 9 is a block diagram illustrating an alternative embodiment of timing device 535' using a counter. The output of counter 555 drives switch 525 of FIG. 7. Counter 555 counts cyclically producing the output signal when ever the terminal count is reached. Counter 555 receives a new value from reset value controlled by base station 560. If the reset value is closer to the terminal count of the counter than the value before reset, the pulses are advanced in time. If the reset value is closer to the initial count of the counter than the value before reset, the pulses are delayed in time.

Figure 10:
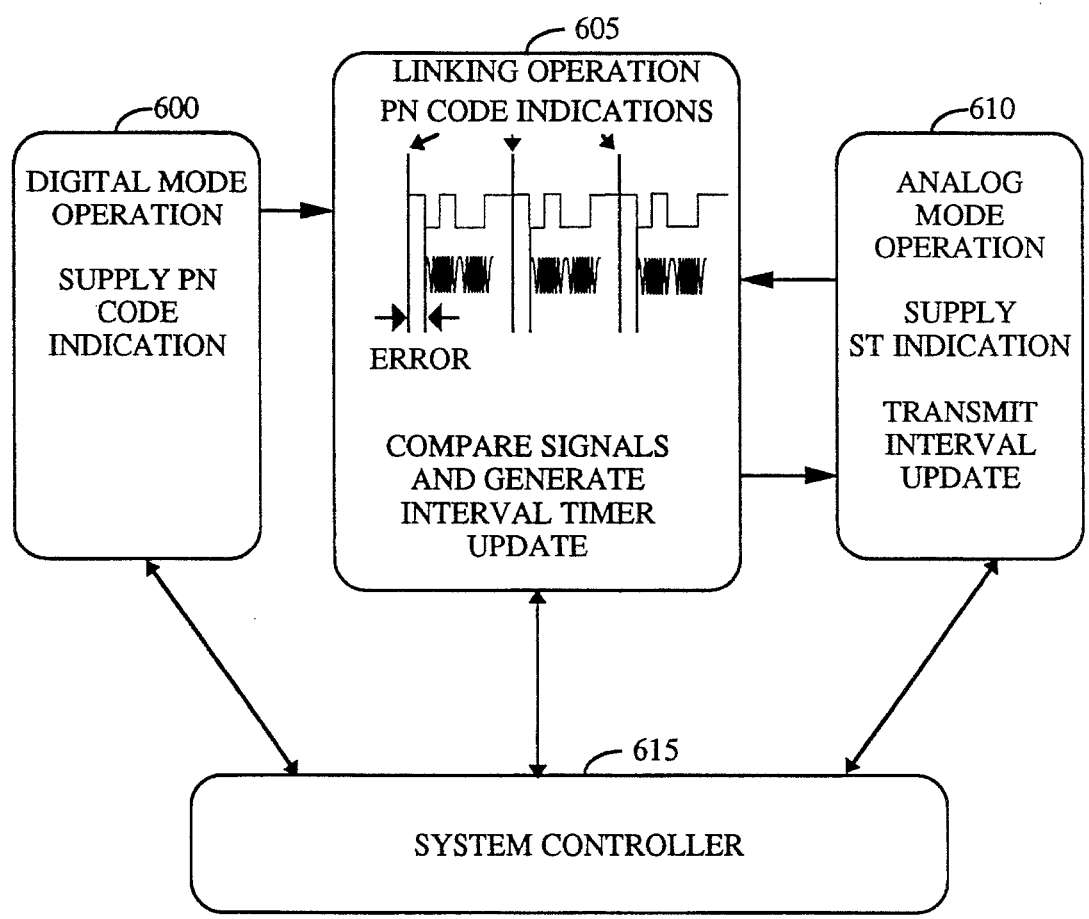
FIG. 10 is a block diagram of the base station operations to support analog mode time alignment.

To complete the time alignment of the mobile station, analog mode operation and digital mode operation must be linked at the base station. FIG. 10 illustrates an exemplary block diagram of the time alignment structure at a base station. System controller 615 controls the handoff and time alignment process. System controller 615 may communicate with other base stations and need not be co-located with the remainder of the base station. One system controller may control multiple base stations.

Digital mode operation 600 supplies an indication when the PN code phase is zero. Digital mode operation 600 need only supply the indication not the PN code itself. Analog mode operation 610 supplies linking operation 605 with the ST reception information from the mobile station. Analog mode operation 610 need only supply an indication corresponding to leading edges of the incoming signal not the actual received waveform. Linking operation 605 compares the PN code indication to the ST indication and determines an error. Linking operation 605 selects the proper interval update FVC data stream word based on the error. Analog mode operation 610 then transmits the interval update FVC data stream to the mobile station.

The partitioning of the functions shown in FIG. 10 is exemplary and alternative partitioning to complete the functions are numerous. For example instead of linking operation 605 selecting the proper interval update FVC data stream word, link operation 605 could passes the error information to analog mode operation 610 where the proper interval update FVC data stream word would be created. The function could also be implemented by passing the error signal to system controller 615 where the proper word would be created and passed to analog mode operation 610 for transmission.

Figure 11:
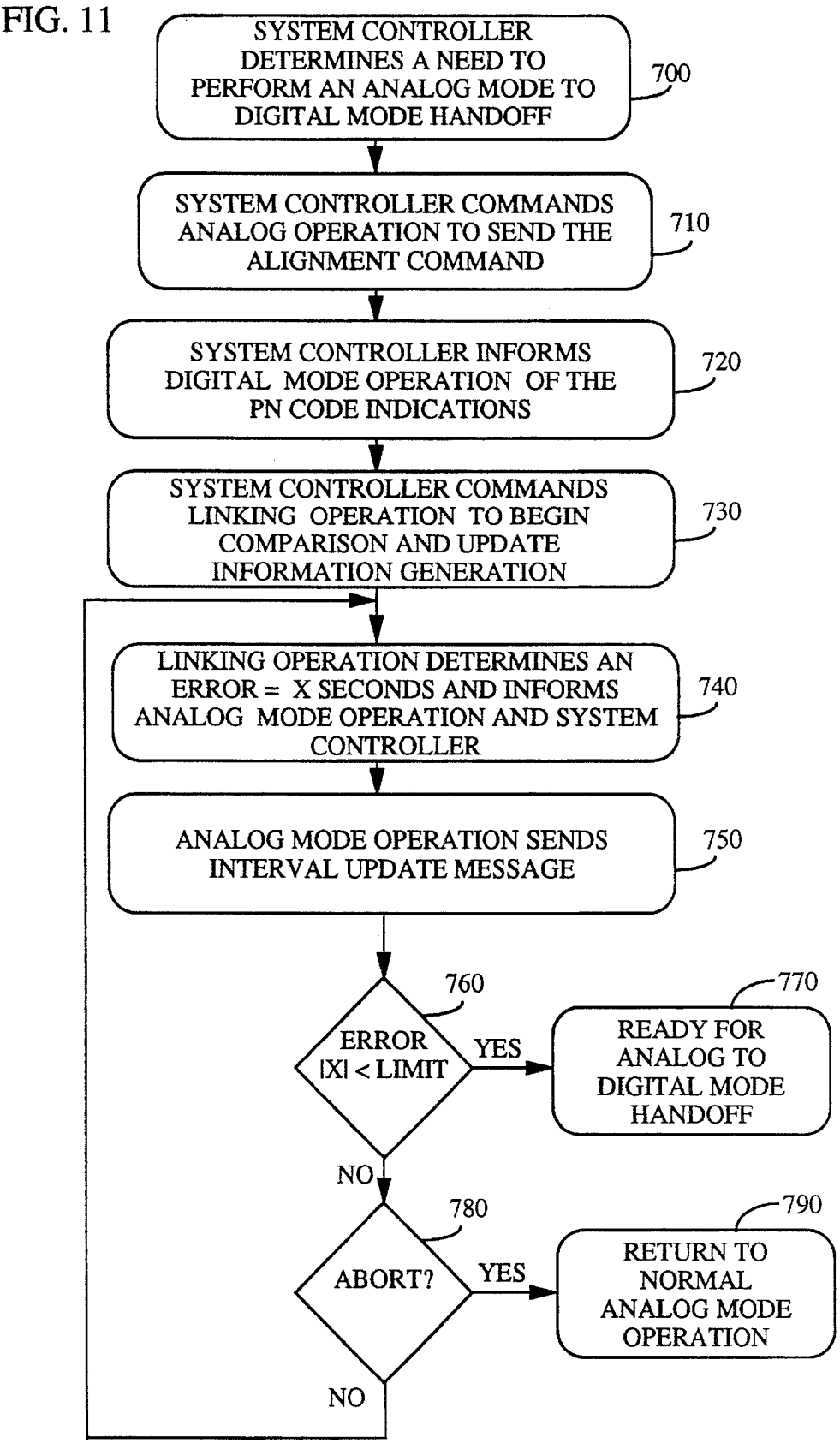
FIG. 11 is a diagram illustrating the various events in the base station during analog mode time alignment.

FIG. 11 is illustrates the flow of operation in the time alignment process within the base station and system controller. In block 700, the system controller, determines the need to perform an analog mode to digital mode handoff for a particular mobile station. The system controller commands the analog mode operation to send the alignment command to the mobile station, block 710, using a standard FVC data stream word as discussed in connection with the mobile station operation. The system controller also commands the analog mode operation to supply the indications of the ST burst from the particular mobile station in response to the alignment command. The system controller commands the digital mode operation to supply proper PN code phase indications of the destination the base station, block 720. The system controller commands the linking operation to begin the comparison function to determine time error and to provide proper interval timer update information for the particular mobile station based on that error, block 730. The linking operation determines an error with units of time from the comparison of the two incoming signals, block 740 and passes the appropriate information to the analog mode operation. The analog mode operation transmits a subsequent FVC data stream comprising a word indicating the interval timer update action for the mobile station, block 750. The linking operation also compares the error to a limit value to determine when the alignment is adequate, block 760. If the error is within the limits set, the particular mobile station is ready for the system controller to command an analog mode to digital mode handoff, block 770. The linking structure monitors the system controller for an abort message indicating that the handoff, and therefore the alignment, is no longer necessary, block 780. If received, the system returns to normal analog mode operation and the linking operation is freed for use with other mobile stations, block 790. If the process is not aborted, the alignment process returns to block 740 and alignment continues.

It is not necessary that the mobile station receive a series of update messages. The base station could send a single interval update to the mobile station. In such a case the mobile station might never transmit the aligned ST pulse and the interval update message would also indicate the termination of the alignment process.

Figure 12:
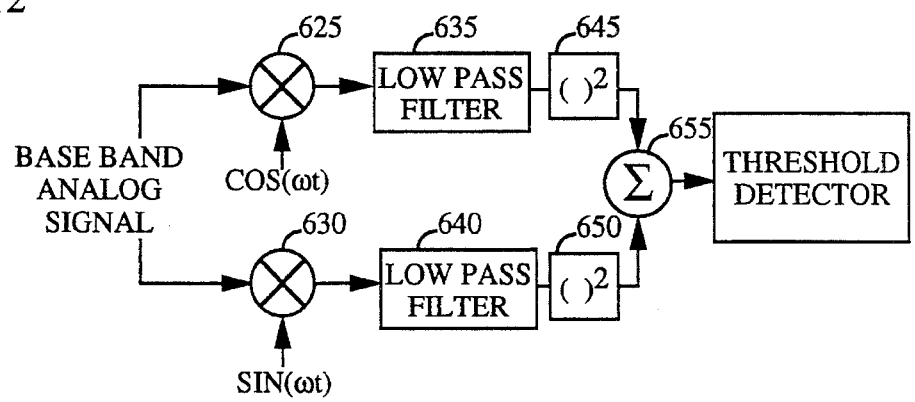
FIG. 12 is a block diagram illustrating a implementation of the ST pulse edge detection.

At the base station, the indication of the ST pulses can be developed as shown in FIG. 12. The baseband analog signal is multiplied by a cosine wave and a sine wave at the frequency of the ST by mixers 625 and 630, each producing a resultant D.C. signal. Unwanted components at the output of mixers 625 and 630 are filtered by low pass filters 635 and 640 respectively which are matched to the ST pulse transmitted by the mobile station. The filtered outputs are squared by square law device 645 and 650 and added by adder 655 to produce an estimate of power at that time offset. The output of adder 655 is compared to a threshold by threshold detector 690. If the output of adder 655 exceeds the threshold, an indication of the ST pulse leading edge is generated. This specific implementation can be replaced by a variety of detection circuits well known in the field.

The above description assumes that the linking operation is supplied an indicator for each of the ST pulses. This may not be the preferred embodiment. For example, significant processing may be required to perform the linking operation for every ST pulse. The alternative method described below provides a filtering process. In addition the indication generated by receiving a single ST pulse may have significant time errors in a fading environment.

The phase comparison operation performed by the linking operation is a basic function performed in many modern circuits. An analog phase detector, as used in analog phase lock loops, can be used which produces an analog signal proportional the error. Alternative, the operation could be performed as a solely digital function producing a digital signal indicative of the error. The error signal produced could be signed or absolute. For example, a signed system would be capable of sending the mobile station commands to both advance and delay the timing while an absolute error system would always send a command to advance timing. The comparison could produce a magnitude error meaning that the mobile station could be commanded to advance the timing by varying increments of time depending on the magnitude of the error. Signed and magnitude error information serves to speed the alignment process in analog mode.

Figure 13:
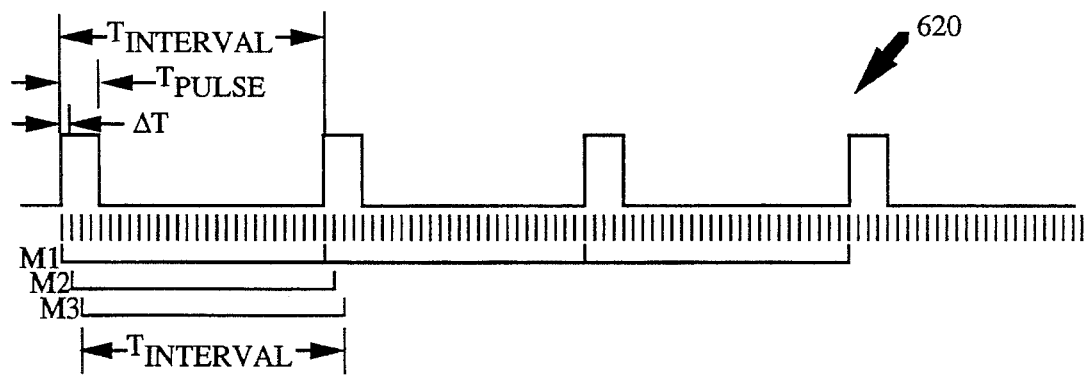
FIG. 13 illustrates timing for a configuration for detecting leading edge of the arriving ST at the base station.

FIG. 13 illustrates the timing used with one implementation. Pulse train 620 represents the ST pulses as sent by the mobile station. The pulse stream that arrives at the base station is corrupted by noise, by multipath and by interference. To find the leading edge of the pattern, the base station equipment samples the incoming signal at a sample period, $\Delta T$, a multiple of which is $T_{INTERVAL}$. Samples displaced $T_{INTERVAL}$ in time are added together over multiple cycles of the ST signal and accumulated results are stored. M1 indicates a set of samples, the sum which is stored in memory, e.g. in memory location 1. M2 represent the next set of samples which arrive $\Delta T$ after each of the samples of M1 and the sum of which is also stored in memory, e.g. in memory location 2. M3 represents the next set of pulses.

Figure 14:
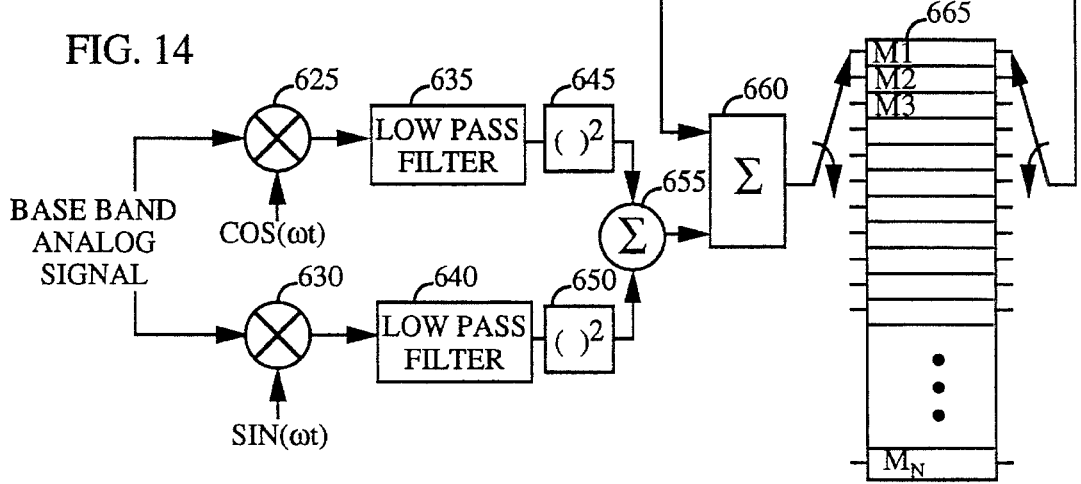
FIG. 14 is a block diagram illustrating a configuration to implement indication detection in conjunction with FIG. 13.

FIG. 14 shows a block diagram of a configuration to implement in the base station the functions associated with FIG. 13 and incorporating the structure of FIG. 12. The output of adder 655 is added by second adder 660 with the stored value in the corresponding memory location and the result restored in memory 665. The memory location with the highest accumulated value occurring first in time is the best estimate of the leading edge of the pulse train.

The analog mode circuitry can also provide a signal termed reliability. This signal could be created by comparing the relative magnitude of the values stored in memory to produce a signal that the system controller could use to determine the probability that the leading edge of the mobile station is the same as the leading edge assumed by the base station. The value of reliability could dictate alignment algorithm parameters including the duration of the alignment, $T_{PULSE}$, and $T_{INTERVAL}$. Reliability can be provided even if alternative leading edge detection methods are used.

Figure 15:
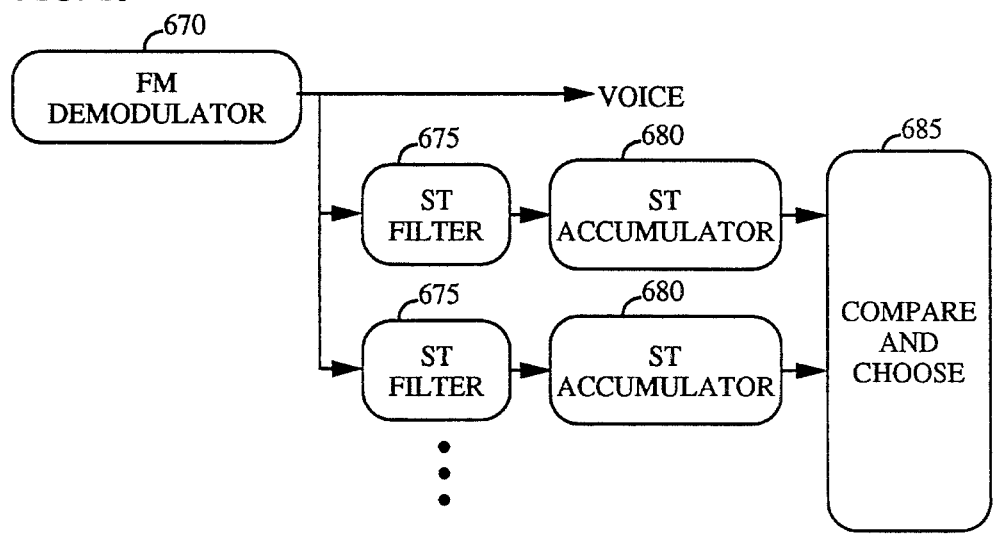
FIG. 15 is an alternative block diagram illustrating a configuration to implement indication detection.

An alternative embodiment of the leading edge detection mechanism is shown in FIG. 15. Standard FM demodulator 670 produces baseband voice signal and the ST signal. Each filter 675 in a bank of filters at the ST frequency produces a signal for a corresponding accumulator 680. Each accumulator 680 in the bank of accumulators, accumulates signal strengths over a different time period. Compare and choose circuitry 685, which may be implemented in microprocessor form under program control, selects the output having the largest value and therefore indicate the most likely time of the pulse occurrence. Again compare and choose circuitry 685 may produce a reliability measurement based on the output of the bank of accumulators.

The effectiveness of the alignment process described above is highly dependent on many variables. The precision with which the analog mode operation is able to supply ST indications depends upon the algorithm and it's parameters, the signal to noise ratio and the fading on the channel.

In a standard cellular analog system using the above techniques, the error in timing when the analog mode to digital mode handoff is made can be on the order of a few milliseconds. After handoff, an error of this magnitude would produce a digital mode alignment time on the order of 100 milliseconds as compared to the intolerable several second discontinuity in service without the use of this technique.

The procedure defined herein is a general alignment procedure for an analog mode system and the uses and applications of such a procedure are numerous. The example method described herein was implemented using the ST of the AMPS system; however analogous alternative pulses could easily be utilized within other operating systems. Also operating within the AMPS protocol, the ST may be rapidly turned on and off at regular or irregular intervals over the duration $T_{PULSE}$. A rapid on/off sequence within of an ST can increase the precision with which the analog mode is able to supply the ST indications. Such a sequence could also be used to add a special indication to a subset of burst in a series of burst from a single mobile station.

Likewise the timing to which the mobile station is aligned with is not necessarily PN code sequence zero phase indication and can be any signal indicating time. The alignment for the purposes of handoff is applicable to many digital systems such as TDMA. Also the alignment method could be used to implement functions that require timing adjustments in purely analog mode.

The method described above synchronizes the mobile station to an overall system clock modulo $T_{INTERVAL}$. It does not impart absolute time of day information to the mobile station. However having attained the time alignment, an absolute time of day or other timing information can be imparted to the mobile station using a method based on the synchronization already achieved.

The uses of absolute time of day are numerous within a mobile station. An obvious use is to provide an accurate clock to the user. Another use can be illustrated by a continuation of the CDMA system example. In the example if the mobile station is requested to handoff from analog mode to digital mode, the mobile station enters digital mode and performs an acquisition of pilot time and begins to receive data from the base station. Before the call can be re-established with the mobile station the base station must transfer to the mobile station system configuration and parameter information. It must also impart to the mobile station a secondary PN code state. The secondary code is called the long code since the PN code sequence length is much longer than the PN code sequence used for acquisition. Further details on the use of the secondary PN code sequence can be found in the previously mentioned U.S. Pat. No. 5,103,459. Like the absolute time of day, the long code state can not be determined based solely on the acquisition of the short PN code since the short PN code repeats many times within one long PN code cycle. Therefore the long code state information can be considered analogous to time of day information.

Returning to the example of the mobile station operating under the AMPS protocol, a normal FVC data stream containing a word indicating specific time of day information is not able to transfer this information to the mobile station with accuracy. The words of a FVC data stream are repeated 11 times. The receive signal processing circuitry typically passes on to the microprocessor and software control circuitry the first of those words which is properly decoded. Each 40 bit word and 48 bit overhead sequence is transmitted at a 10 kilobit rate making the time difference between two words about 8.8 milliseconds and the time between the start of the first word and the start of the last word of a single FVC data stream 88 milliseconds. Obviously this does not allow absolute timing errors on the order of 1 millisecond to be transferred to the mobile station in such a manner.

However relying on the information about time that the mobile station and the base station have attained during the synchronization process described above, the transmission of precise time of day information is possible. The message sent from the base station, instead of transmitting the value of the current time, transmits a signal which indicates that at some future time as dictated by the interval timer, the time will have a certain value.

Figure 16:
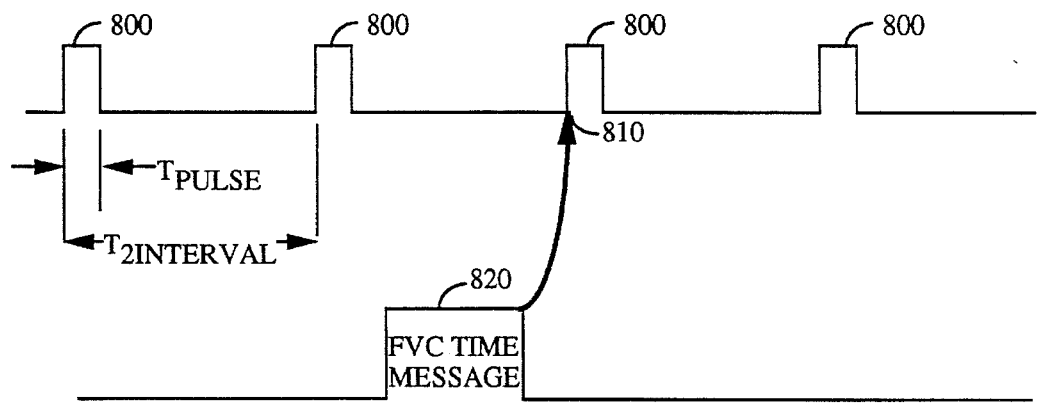
FIG. 16 is timing diagram illustrating transfer of absolute time of day information.

The time of day transfer is illustrated in FIG. 16 for an AMPS signaling protocol example. The ST pulses 800 are transmitted from the mobile station periodically over time. The base station has completed the alignment function and therefore has knowledge of the mobile station ST time relative to a time of day indication stored at the base station. The base station transmits a FVC data steam using the standard format containing a word indicating that at some future time related to the interval timer the time will be some value. The mobile station recognizes the command and sets or resets the value absolute time of day to match the message. Note that is not necessary that the ST pulse continue to be transmitted from the mobile station during this process.

It is evident from examination of FIG. 16 that if the interval time is less than the time it takes to transmit and decode the entire FVC data stream that an ambiguity maybe introduced into the procedure. This ambiguity can be removed by any one of several methods. The original interval time, $T_{INTERVAL}$, can be changed to a second value interval time, $T_{2INTERVAL}$, to accommodate the time duration of an FVC data stream. This situation is illustrated in FIG. 16. $T_{2INTERVAL}$ is of sufficient duration to allow the transmission of FVC time message 820 between ST pulses. The FVC time message 820 indicates the absolute time of day at start of the next ST burst 810.

Figure 17:
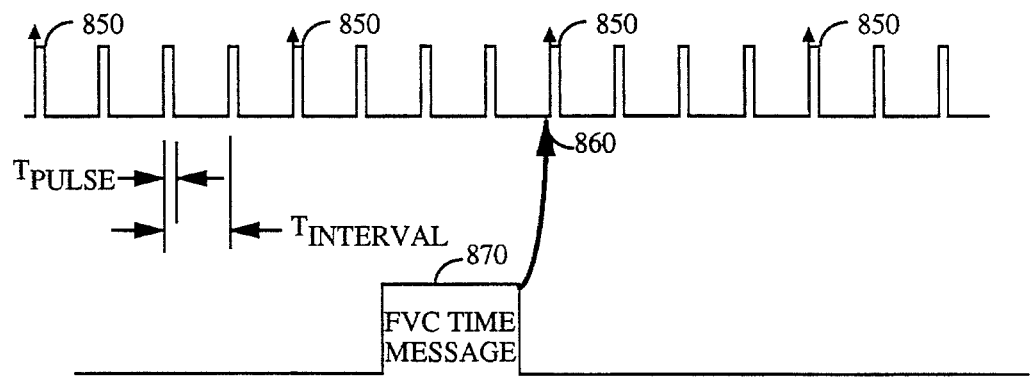
FIG. 17 is timing diagram illustrating transfer of absolute time of day information in alternative embodiment from FIG. 16.

Another method of overcoming ambiguity involves adding an indicator to a subset of the ST pulses. The indicator is detectable by the base station and periodically transmitted by the mobile station at a period of sufficient duration to accommodate the time duration of an FVC data stream. FIG. 17 illustrates the timing of such a method. ST pulses with indicators 850 are transmitted at a rate that allows FVC time message 870 to be fully transmitted and decoded. FVC time message 870 indicates that, at the start of the next ST burst containing an indicator, at time 860, the absolute time of day.

The transfer of the long code state to the mobile station decreases the acquisition time in digital mode by removing the necessity of transferring the information to the mobile station between the time the call is dropped by the analog system and the start of communication between base station and the mobile station in digital mode As with the time alignment function, the absolute time of day requires the mobile station to recognize a new set of FVC data stream words but does not require additional hardware. As described above, the absolute time of day transfer is only exact if the time alignment is achieved. However use of the time alignment can be independent of the use of the absolute time of day transfer.

The use of absolute time of day transfer is discussed herein in conjunction with decreased acquisition time in digital mode following a handoff from analog mode. The uses of this function are numerous and the systems in which such a function is advantages are diverse. The method can be used in a solely analog situation to provide absolute time of day information.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. In a communication system including a mobile station and a base station, a method of time aligning a mobile station to a predetermined system time provided by a base station comprising the steps of:

providing by said mobile station during periodic intervals a periodic timing signal in a first direction over a communication channel, said periodic intervals being of a duration related to a digital mode modulation period of said communication system, each period of said periodic timing signal having a leading edge;

detecting at said base station one of the leading edges;

providing at said base station a series of periodic indications of said predetermined system time;

comparing in time one of said leading edges to one of said periodic indications;

generating from the comparison an error signal;

imparting to said mobile station by said base station, in a second direction over said communication channel, an indication of an error corresponding to said error signal; and delaying at said mobile station a next leading edge of said periodic timing signal in response to said indication of an error corresponding to said error signal.

2. The method of claim 1 further comprising the step of informing said mobile station by said base station of an absolute time of day corresponding to the leading edge of said periodic timing signal occurring at a future time.

3. The method of claim 1 wherein said step of delaying includes the step of adjusting a timing device within said mobile station in response to said indication of an error corresponding to said error signal.

4. The method of claim 3 further including the step of switching said mobile station from operation in an analog mode to operation in a digital mode upon said mobile station timing device becoming aligned with said predetermined system time.

5. The method of claim 1 further including the step of providing by said mobile station, during selected intervals between each of the leading edges of said periodic timing signal, a data packet to said base station in said first direction over said communication channel.

6. A time-alignment system for synchronizing timing within a mobile station to a predetermined system time provided by a base station, said time-alignment system comprising:
   a mobile station transmitter for providing during periodic intervals a periodic signal in a first direction over a communication channel, said periodic intervals being of a duration related to a system digital mode modulation period;
   a base station receiver for detecting at said base station a beginning of a first period within said periodic signal;
   a timing generator for providing at said base station a series of periodic indications of said predetermined system time;
   a comparator for comparing in time said beginning of said first period to one of said periodic indications, said comparator generating from the comparison an error signal;
   a base station transmitter for conveying to said mobile station by said base station, in a second direction over said communication channel, an indication of an error corresponding to said error signal; and
   a timing adjustment circuit at said mobile station for adjusting timing of said mobile station transmitter in response to said indication of an error corresponding to said error signal, thereby synchronizing timing of a digital modulation sequence used in said mobile station to said predetermined system time.

7. The system of claim 6 wherein said base station transmitter operates to adjust timing of said beginning of said first period of said periodic signal in order to convey absolute time of day information to said mobile station.

8. The system of claim 6 wherein said timing adjustment circuit includes an interval timer, said interval timer being incremented in response to said indication of an error signal.

9. The system of claim 6 further including a mobile station controller disposed to switch said mobile station from operation in an analog mode to operation in a digital mode upon said mobile station transmitter becoming synchronized to said predetermined system time.

10. In a communication system including a mobile station and a base station, a time-alignment system for synchronizing timing within a mobile station to a predetermined system time provided by a base station, said mobile station being operative in an analog mode and in a digital mode, said time-alignment system comprising:
    a mobile station transmitter for providing during periodic intervals by said mobile station a periodic timing signal during operation of said mobile station in said analog mode, said periodic intervals each being of a duration related to a period of an encoding sequence of said communication system;
    a base station receiver for detecting at said base station a beginning of a first period within said periodic timing signal;
    a timing generator for providing at said base station a series of periodic indications of said predetermined system time;
    a comparator for comparing in time said beginning of said first period to one of said periodic indications, said comparator generating from the comparison an error signal;
    a base station transmitter for imparting to said mobile station an indication of an error corresponding to said error signal; and
    a timing adjustment circuit for delaying transmission by said mobile station transmitter a next period of said periodic timing signal in response to said indication of an error corresponding to said error signal in order to synchronize said digital mode operation of said mobile station to said predetermined system time.

11. The system of claim 10 further comprising means for informing said mobile station by said base station of an absolute time of day corresponding to the occurrence of said beginning of said first period of said periodic timing signal.

12. The system of claim 10 wherein said timing adjustment circuit operates to adjust a timing device within said mobile station in response to said indication of an error corresponding to said error signal, said timing device being disposed to provide timing information during operation in said digital mode.

13. The system of claim 10 further including a mobile station controller for switching said mobile station from operation in said analog mode to operation in said digital mode upon said mobile station becoming synchronized to said predetermined system time.

14. The system of claim 10 wherein said mobile station transmitter operates to provide, during selected intervals between each period of said periodic timing signal, analog data to said base station.

15. A method of time aligning a mobile station to a predetermined system time provided by a base station, said mobile station being disposed to operate in analog and digital modes, comprising the steps of:
    providing during periodic intervals by said mobile station a periodic timing signal during operation of said mobile station in said analog mode, said periodic intervals being of a duration related to a mobile station digital mode modulation period, each period of said periodic timing signal having a leading edge;
    detecting at said base station one of the leading edges;
    providing at said base station a series of periodic indications of said predetermined system time;
    comparing in time one of said leading edges to one of said periodic indications;
    generating from the comparison an error signal;
    imparting to said mobile station by said base station an indication of an error corresponding to said error signal; and
    delaying at said mobile station a next leading edge of said periodic timing signal in response to said indication of an error corresponding to said error signal thereby synchronizing said digital mode operation of said mobile station to said predetermined system time.

16. The method of claim 15 further including the step of informing said mobile station by said base station of an absolute time of day corresponding to the leading edge of said periodic timing signal occurring at a future time.

17. The method of claim 15 wherein said step of delaying includes the step of adjusting a timing device within said mobile station in response to said indication of an error corresponding to said error signal, said timing device being disposed to provide timing information during operation in said digital mode.

18. The method of claim 15 further including the step of switching said mobile station from operation in said analog mode to operation in said digital mode upon said mobile station becoming to said predetermined system time.

19. The method of claim 15 further including the step of providing by said mobile station, during selected intervals between each of the leading edges of said periodic timing signal, analog data to said base station.

20. In a cellular communication system including a mobile station in communication with a base station, said mobile station being operative in both analog and digital modes, a method of synchronizing said digital mode operation of said mobile station to a predetermined system time provided by said base station, said method comprising the steps of:

transmitting during periodic intervals from said mobile station to said base station a periodic signal, said periodic signal being of a phase related to timing of said digital mode operation of said mobile station and said periodic intervals being of a duration related to a period of a digital modulation sequence of said system;

detecting, at said base station, said phase of said periodic signal and generating an error signal by comparing the detected phase to a reference signal derived from said predetermined system time; and adjusting said phase of said periodic signal in accordance with said error signal so as to align timing of said digital modulation sequence to said predetermined system time.

21. The method of claim 20 wherein each period of said periodic signal includes a leading edge, and wherein said step of adjusting said phase includes the step of delaying at said mobile station leading edges of said periodic signal in accordance with said error signal.

22. The method of claim 21 wherein said step of delaying includes the step of adjusting a timing device within said mobile station on the basis of said error signal, said timing device governing said timing of said digital mode operation of said mobile station.

23. In a cellular communication system including a mobile station in communication with a base station, said mobile station being operative in both analog and digital modes, a time-alignment system for synchronizing said digital mode operation of said mobile station to a predetermined system time provided by said base station, said time-alignment system comprising:

a mobile station transmitter for transmitting during periodic intervals from said mobile station to said base station a periodic signal, said periodic signal being of a phase related to timing of said digital mode operation of said mobile station and said periodic intervals being of a duration related to a period of a digital modulation sequence of said system;

a base station receiver for detecting, at said base station, said phase of said periodic signal and for generating an error signal by comparing the detected phase to a reference signal derived from said predetermined system time; and a timing adjustment circuit for adjusting said phase of said periodic signal in accordance with said error signal so as to align timing of said digital modulation sequence of said mobile station to said predetermined system time.

24. The time-alignment system of claim 23 wherein each period of said periodic signal includes a leading edge, and wherein said timing adjustment circuit operates to delay at said mobile station leading edges of said periodic signal in accordance with said error signal.

25. The time-alignment system of claim 24 wherein said timing adjustment circuit operates to adjust timing of a timing device within said mobile station on the basis of said error signal, said timing device governing said digital mode operation of said mobile station.

26. In a cellular communication system including a mobile station and a base station in communication over a communication channel, a time-alignment system for synchronizing a timing device within said mobile station to a predetermined system time provided by said base station, said time-alignment system comprising:

a mobile station transmitter for transmitting during periodic intervals from said mobile station to said base station in a first direction over said communication channel a periodic signal, said periodic signal being of a phase determined by said timing device wherein said periodic intervals are of a duration related to a period of a digital modulation sequence of said system;

a base station receiver for detecting, at said base station, said phase of said periodic signal and for generating an error signal by comparing the detected phase to a reference signal derived from said predetermined system time; and a base station transmitter for providing to said mobile station a timing adjustment signal indicative of the results of the comparison in a second direction over said communication channel, said mobile station including a timing adjustment circuit for adjusting said timing device on the basis of said timing adjustment signal.

27. In a system including a remote station in communication with a base station, said remote station being operative in both analog and digital modes, a method of facilitating handoff of operation of said remote station in said analog mode to operation of said remote station in said digital mode, said method comprising the steps of:

transmitting during periodic intervals from said remote station to said base station a periodic signal, said periodic signal being of a phase determined by timing of said digital mode operation of said remote station and said periodic intervals being of a duration related to a period of a digital modulation sequence used in said remote station;

detecting, at said base station, said phase of said periodic signal and generating an error signal by comparing the detected phase to a reference signal derived from a predetermined system time;

adjusting said phase of said periodic signal in accordance with said error signal so as to align said timing of said digital modulation sequence with said predetermined system time; and switching operation of said remote station from said analog mode to said digital mode upon said timing of said digital mode of operation becoming aligned with said predetermined system time.

* * * * *